Figure 10:
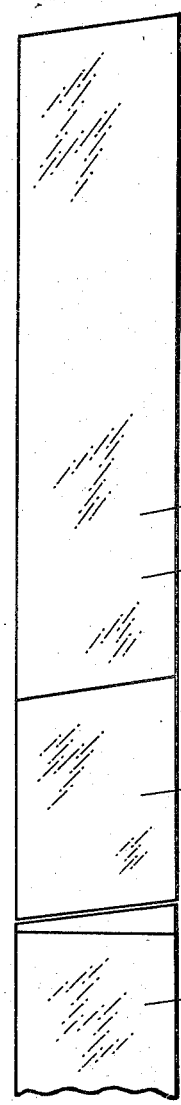

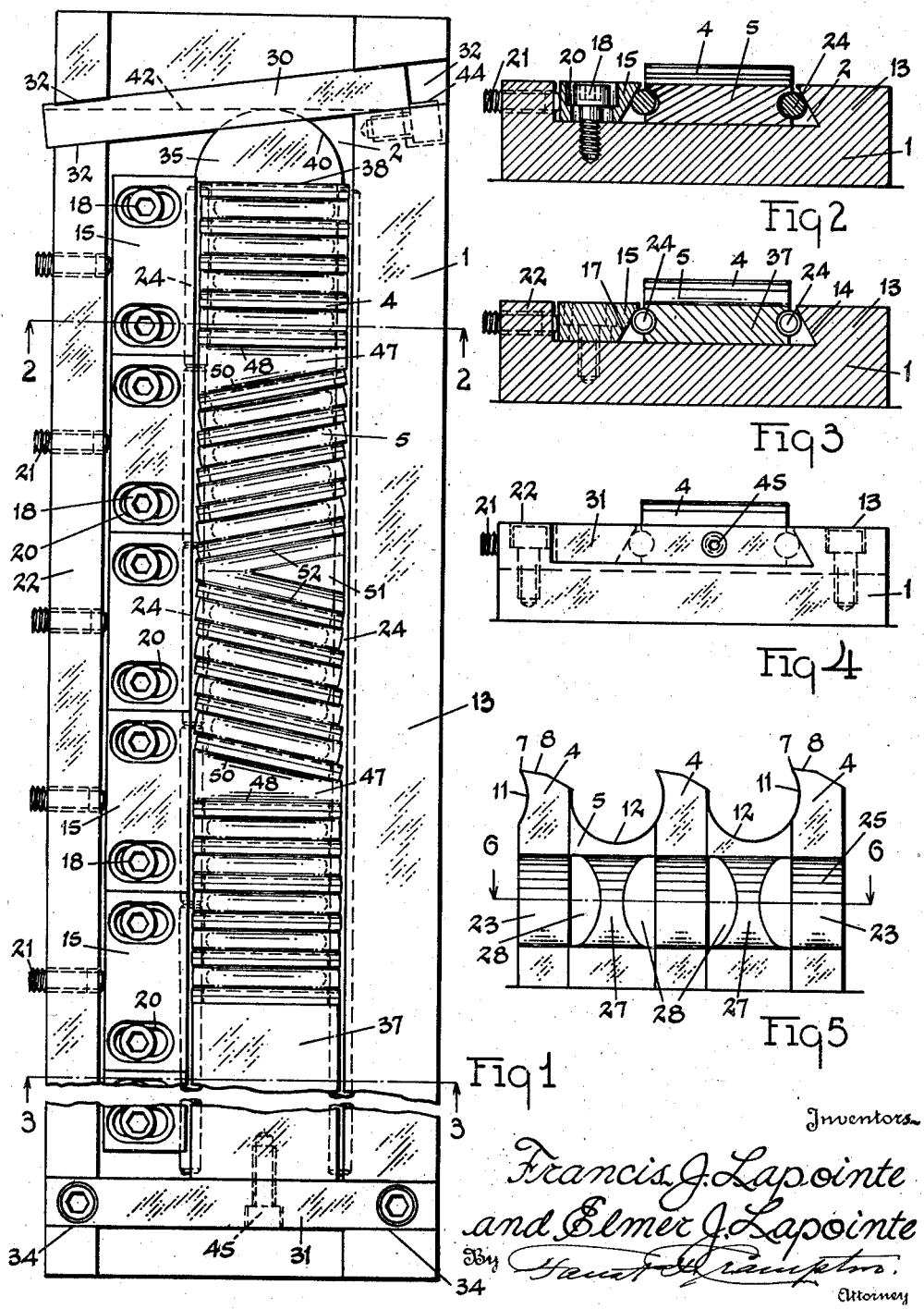

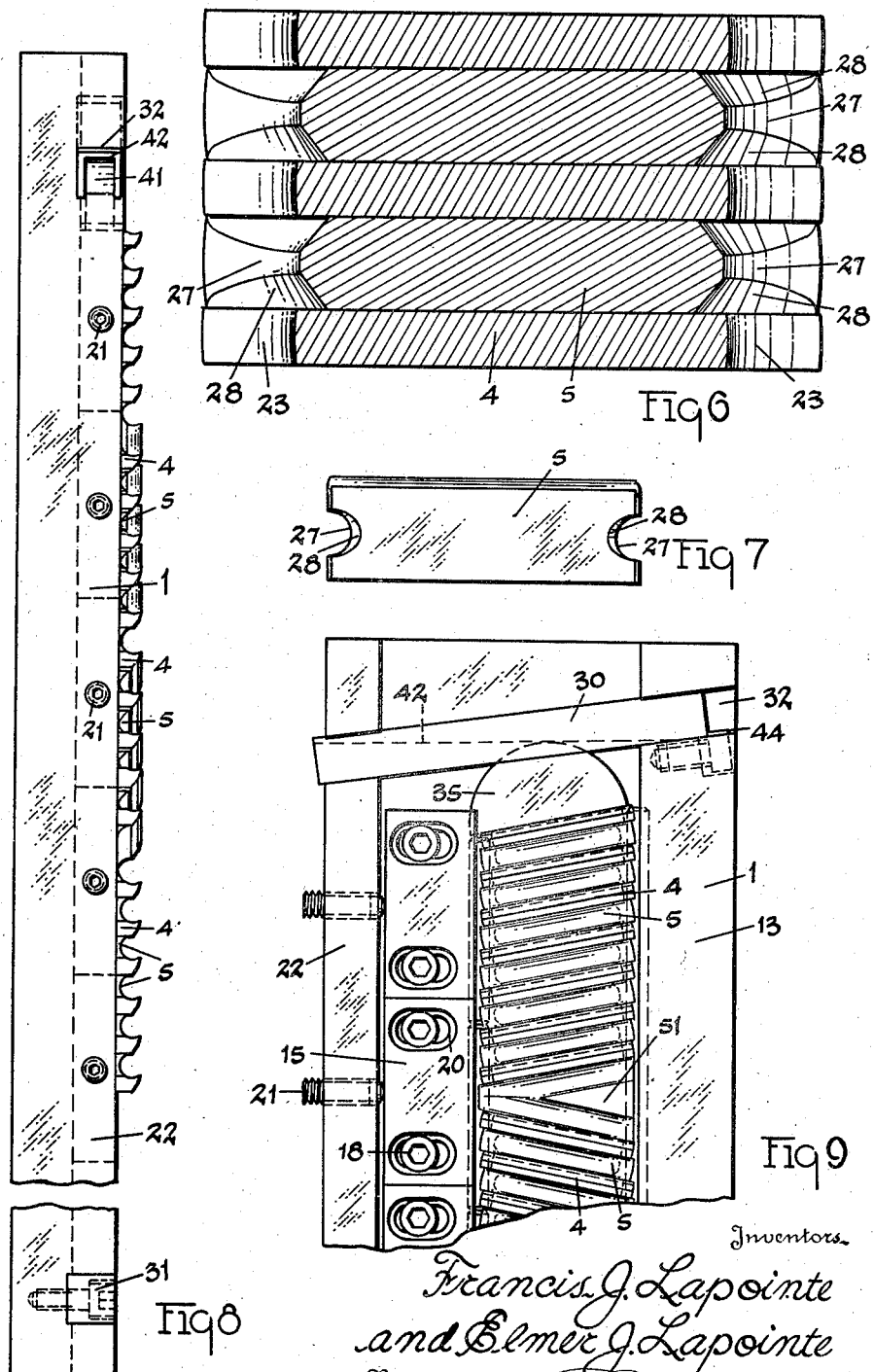

June 11, 1940.  F. J. LAPOINTE ET AL  2,204,537
SURFACE BROACH
Filed April 20, 1938  3 Sheets-Sheet 3

Inventors
Francis J. Lapointe
and Elmer J. Lapointe
By Faust F. Crampton
Attorney Patented June 11, 1940

2,204,537

UNITED STATES PATENT OFFICE 2,204,537

SURFACE BROACH

Francis J. Lapointe and Elmer J. Lapointe, Ann Arbor, Mich., assignors to American Broach and Machine Company, Ann Arbor, Mich., a corporation of Michigan Application April 20, 1938, Serial No. 203,121

16 Claims. (Cl. 29—95.1)

Our invention has for its object to provide a surface broach having replaceable broach-cutting teeth and spacers and means for securely locking the teeth and the spacers together, whereby surface cutting broaches specifically adapted to surface cut particular work may be readily assembled or formed. Thus, broaches of different forms may be produced to broach-cut metals of different kinds and over surfaces having different widths and lengths and, by use of spacers having different thickness, to form desired metal gathering chambers of different sizes according to the different amounts of metal cut from the work per tooth. Also, each broach may be readily assembled to produce desired surface finishing according to the character of the metal of which the work is formed. Also, the teeth and the spacers may be secured in desired relations with respect to the direction in which the broach is moved when broach-cutting, such as to produce draw cutting, or rough cutting, or surface finish.

As is well known in the art of surface broaching, the broaches have a high first cost and high maintenance cost by reason of the expense of grinding and shaping of the high refractory, tough, hard metal of which they are necessarily formed to produce cutting edges that will withstand the cutting operations, such as when cutting rough castings that have metal grinding crust-like surfaces that quickly dull the cutting edges. Also, the concavedly curved inner surfaces, or rake surfaces, of the teeth cannot be accurately formed and ground, with respect to the outer surfaces, or the tool clearance surfaces, to form the cutting edges of the broach, because of inaccessibility of the rake surfaces. Consequently, cutting edges of uniform sharpness and form cannot be accurately made. Also, separate broaches of different lengths and different widths, and teeth disposed at different angles, with respect to the movement of the broach and chip chambers of different widths, are required to produce different kinds of work, which necessitates a large investment to stock broaches preparatory to surface broaching articles.

By our invention the surface broaches of different lengths and widths may be made up of plurality of small parts when required, and the parts having the cutting edges may be formed of hard tough metal and may be arcuately finished as to all of their surfaces to produce accurate cutting edges.

The invention also provides means for securely locking the assembled parts to rigidly hold them in proper broach-cutting relation while subjected to the high pressures necessary to cause a number of teeth to simultaneously cut the metal article.

The invention consists in other features which will appear from the following description and upon examination of the drawings forming a part hereof. Structures containing the invention may partake of different forms and may be varied in their details and still embody the invention. To illustrate a practical application of the invention, we have selected a surface broach as an example of the various structures that contain the invention and shall describe the selected structure hereinafter, it being understood that certain features of our invention may be used to advantage without a corresponding use of other features of the invention and without departing from the spirit of the invention as presented in the claims. The particular structure selected is shown in the accompanying drawings.

Figure 11:
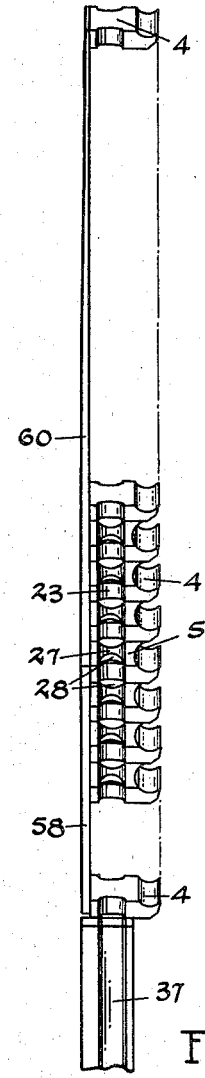

Fig. 1 illustrates a top view of the broach selected as an example of an embodiment of the invention. Fig. 2 is a view of a section taken on the plane of the line 2—2 indicated in Fig. 1. Fig. 3 is a view of a section taken on the plane of the line 3—3 indicated in Fig. 1. Fig. 4 is an end view of the broach. Fig. 5 illustrates an enlarged end view of a plurality of separable teeth and teeth spacers. Fig. 6 is a view of a section of the teeth and spacers shown in Fig. 5 taken on the plane of the line 6—6 indicated in Fig. 5. Fig. 7 is a side view of one of the spacers shown in Fig. 1. Fig. 8 is a side view of the broach shown in Fig. 1. Fig. 9 illustrates the separable spacers and teeth located in predetermined angles different from that in which they are shown in Fig. 1. Fig. 10 illustrates a plate for disposing the cutting edges of the broach in planes inclined to the direction in which the broach is moved when broach-cutting. Fig. 11 illustrates an edge view of the plate and teeth mounted thereon.

The broach comprises a bar or base member 1 having a longitudinally extending recess 2 in which cutting teeth 4 and teeth spacers 5 are located. The bar or base member 1 is secured in a broaching machine in a position such that when the member is moved, the cutting edges of the teeth will progressively and sequentially remove metal from the surface of the article. If the bottom of the recess 2 is located parallel to the direction in which the broach is moved, the teeth, if located on the bottom of the recess, have progressively increasing width to produce progressive surface cutting of the article. If the bottom of the surface is inclined, with reference to the direction in which the broach is moved, the width of the cutting teeth may be the same, or where the bottom of the recess is located in a plane parallel to the direction in which the broach is moved, a shim or plate having opposite side surfaces that are inclined relative to each other, may be disposed on the bottom of the recess, and teeth having the same width may be located on the plate to produce the progressive removal of surface portions of the article as the broach is moved relative to the article. The bar or base member 1 may be made two or three feet long and the teeth and spacers may be made two or six inches long to produce, by assembling the parts, broaches suitable for broach-cutting work of different surface areas.

The teeth 4 are formed from separable blocks or slabs and are provided with cutting edges 7. The cutting edges are formed at the edges of the tool clearance surfaces 8 and the rake surfaces 11. The teeth spacers 5 are also made in the form of separable blocks or slabs having concavedly curved surfaces 12 that form chambers between proximate teeth in which the material removed by the teeth from the work is gathered as the teeth move along the work. Preferably, the rake surface 11 of each of the teeth may be extended curvedly and form, with the surface 12 of the spacer and the rake surface of the following tooth, a continuous curved surface for directing the material removed from the work into the chamber that is thus formed between the teeth as the teeth engage the work. The spacers 5 are provided with a thickness, such as to produce chambers having the desired dimensions. The thickness is largely dependent upon the amount of material that is progressively removed from the work during broach-cutting. Where the teeth are drawn over surfaces of considerable length, thicker spacers are used to produce the required chamber space.

When the teeth and the spacers are assembled, their ends are located substantially in parallel lines and clamped together in a longitudinal direction with respect to the bar or base member and also crosswise with respect to the base member 1, that is, lengthwise of the teeth and spacers 5. The lateral surface 14 of the side 13 of the recess 2 is sloped outwardly and downwardly, substantially as shown in the figures, and clamping members 15 are located in the recess in position to clamp the teeth. The clamping members are provided with surfaces 17 that also slope outwardly and downwardly with respect to the bottom of the recess. The clamping members 15 are secured by screws 18 that extend into the base member 1 through slots 20 formed in the clamping members and by the screws 21 that extend through the side 22 of the recess 2. Preferably, wedging engagement of the teeth is produced by first setting the clamps by the screws 21, and then drawing the clamps toward the bottom of the recess by the screws 18 to wedgedly clamp the teeth and spacers endwise.

The ends of the teeth are provided with surface portions that are formed curvedly convex in planes parallel to the bottom of the recess 2 when the tooth is assembled in the bar or supporting member 1. Consequently, when the teeth 4 are assembled and inclined with respect to the bar and clamped by the operation of the clamping elements 15, each tooth may be engaged at a single point by reason of the curvedly convex surface and be pressed endwise through the said point.

If desired, the ends of the teeth may be provided with recesses 23 that may be formed substantially semi-circular and, consequently, concavedly curved in planes extending at right angles to the bottom of the recess 2. Short rods 24, cylindrical in form and having a diameter slightly smaller than the diameter of the smallest radial dimension of the recesses 23, may be located intermediate the teeth and the sloping wedging surfaces 14 of one side of the recess 2 and the sloping surfaces 17 formed on the clamps 15. When the rods are clamped in the recesses 23 by the operation of the clamping elements 15, the rods 24 will engage the teeth at single points by reason of the curvedly convex surfaces of the bottoms of the recesses, and the teeth will be clamped not only endwise through the said point, but also in a diagonally downward direction against the bottom of the recess 2 of the base member 1.

The spacers 5 have a length substantially the same as that of the teeth. The ends of the spacers are provided with engaging parts to enable the spacers to be clamped endwise. They may be also provided with convexedly curved surfaces. The bottoms of the recesses in the spacers may be formed in the same manner that the bottoms of the recesses in the teeth are formed, that is, they may be formed curvedly convex in planes parallel to the bottom of the recess 2 when assembled therein and either cylindrical, or concavedly curved in planes located at right angles to the bottom of the recess 2. Since the spacers are thicker than the teeth, the bottoms of the recesses 27 may be narrowed by forming lateral sloping surfaces 28 that slope away from each other and to the lateral surfaces of the spacers to provide edge clearance and prevent engagement of the end edges or corners of the spacer with the rods 24 when the spacers are inclined with respect to the sides of the recess 2 to the same extent that the teeth are inclined relative thereto. If the bottoms of the recesses 27 are cylindrically formed, having a common axis through center of the spacer, the sloping surfaces 28 may be omitted. The ends of the teeth may be provided with projecting portions having sloping surfaces extending from the ends of the cylindrical surface that may be also engaged by the rods 24. Preferably, the spacers 5 are provided with recesses 27 that are formed slightly deeper than the recesses of the teeth, such as two-thousandths of an inch, whereby the spacers are clamped diagonally downward against the bottom of the recess 2, and the endwise pressure of the clamps are brought against the ends of the teeth.

To longitudinally clamp the assembled teeth and the spacers together, the ends of the channeled bar or supporting member 1 are provided with cross bars 30 and 31 located in recesses 32 and 34 formed in the sides of the recess 2. Clamping blocks 35 and 37 are located contiguous to the bars. The clamping block 35 is, preferably, provided with a plane surface 39 and a curved surface 40. The bar 30 is, preferably, inclined with respect to the longitudinal axis of the supporting member 1 and is provided with a slot 41 (Fig. 8) having a bottom surface 42 which is inclined with respect to the edges of the bar and so as to dispose the bottom surface 42 substantially at right angles to a line extending lengthwise the assembled teeth and spacers. The bar 30 may thus be moved along the recesses 32 and operated wedgewise against the curved surface 40 of the block 35 to clamp the teeth and the spacers. If desired, it may be forced inwardly to tighten the teeth and the spacers by means of the screw 44 having a head which engages the end of the bar 30. The bar 31 may be secured in the recesses 34 by suitable screws. The block 37 has a length sufficient to fill the space from the assembled teeth and spacers to near the bar 31. Thus, the supporting or base member may be two or three feet long, and as many teeth as may be found desirable for doing any particular type of work may be mounted in the recess 2 and disposed in contact with the block 35, and the block 37, having a length to fill the space between the bar 31 and the last of the teeth, is disposed intermediate the bar 31 and the assembled teeth. The block 37 is secured by a screw 45 to the bar 31. The block 35 will roll on the surface 42 of the channel 41, if the teeth proximate to the block 35 are inclined to the longitudinal axis of the base member. The bar 30 is then forced inwardly over the curved surface of the block 35 to tightly clamp the teeth and the spacers between the blocks 35 and 37. Lateral movement of the block 35 with the bar 30, by frictional contact of the surface 42 with the surface 40, is prevented by engagement of the one end of the surface 40 with one of the clamping members 15.

If desired, certain of the spacers may be formed wedge-shape to incline the teeth with respect to the longitudinal center of the assembled teeth and spacers to produce the desired draw cutting, which, in most metals, produces a smoother cut or finish on the surface of the work. The lateral surfaces of the said spacers may be inclined at different angles. The ends of such spacers are provided with recesses having surfaces that substantially fit the surfaces of the rods 24 to locate their broader ends parallel to the rods when clamped by the rods. Thus, the spacers, such as the spacers 47, have surfaces 48, that extend at right angles to the rods when the teeth and the spacers are assembled, and surfaces 50, that are inclined to the rods, to cause teeth on opposite sides of the spacers to be disposed at the same angle that the contiguous surfaces of the spacers 47 are located, as shown in Fig. 1. Also, spacers, such as the wedge-shaped spacer 51, may be located at points in the assembled teeth to change the angle of inclination of the teeth. The spacer 51 has lateral surfaces 52 that are inclined to each other, the angle between the lateral surfaces being divisible by a plane extending at right angles to the rods when assembled. Also, if desired, the end surface of the block 37 may be inclined to locate the teeth proximate thereto in inclined relation with respect to the rods. Various arrangements may be made with reference to the angle in which the teeth are located by using spacers and blocks having lateral surfaces inclined to each other at different degrees.

The teeth that first engage roughly formed work, such as a casting, are referred to as the "rough-cutting teeth." The rough-cutting teeth are located at right angles to the longitudinal axis of the supporting member 1. In the form of broach shown in Fig. 1, the following two sets of teeth are located inclined in opposite directions to each other to draw-cut the surface. The opposite inclination of the teeth offsets the lateral pressure produced by each set. The teeth of the first, second, and third sets progressively increase in width to progressively remove metal from the work, and, consequently, their edges are disposed in a plane inclined to the plane of the bottom 2 of the recess while the cutting edges of the fourth set of teeth are located in a plane parallel to the bottom of he broach. The teeth of the fourth set produce the surface-finish of the work.

Preferably, the teeth are all formed to have the same height, and a plate 57 is located on the bottom of the recess 2, the plate 57 being provided with a pair of parallel opposite side surfaces 58 and an inclined surface 60 contiguous to one of the side surfaces 58. The surface 60 is inclined toward the other side surface 58 to progressively reduce the thickness of the plate, as illustrated in Fig. 11. The thinner end edge or both of the end edges of the plate 57 may be inclined to the side edges of the plate, if it is desired to locate the teeth of the broach in inclined relation. Also, if desired, the plate may be made up in sections and variations in the relative locations of the teeth as to their angle with the longitudinal axis of the broach may be made as desired. Also, plates of different lengths and widths may be used according to the length and width of the space occupied by the assembled teeth. When the teeth having the same width are located on the plate 57, the cutting edges of the teeth will be located in a plane inclined to the bottom of the recess 2 and cause progressive removal of material from the work as the broach is moved over the work until the teeth, supported on the parallel opposite side surfaces of the plate, engage the work, whereupon the broach will finish-cut the surface of the work.

We claim:

1. A surface broach comprising a base member, a plurality of separable oblong teeth located on the base member each tooth having a cutting edge extending along one side edge thereof, the edges of the teeth having convexedly curved surfaces, and means including elements engaging the curved surfaces for clamping the teeth substantially endwise.

2. A surface broach comprising a base member, a plurality of separable oblong teeth located on the base member, the ends of the teeth substantially located in parallel lines and having registering recesses, means for locating the cutting edges of the teeth in lines inclined to the said parallel lines, elements located in the recesses, and means including the said elements for clamping the teeth endwise.

3. A surface broach comprising a base member, a plurality of separable oblong teeth located on the base member, a rollable clamping member and a clamping element, means for engaging the rollable clamping member, means for locating the cutting edges of the teeth in parallel lines inclined to the longitudinal axis of the base member, and means for clamping the said teeth between the clamping member and the element.

4. A surface broach comprising a plurality of separable oblong teeth, the ends of the teeth substantially located in parallel lines, a pair of clamping members, each member having plane surfaces located parallel to the plane surface of the other member and at an angle to the said lines, and means for clamping the teeth between the members to locate the edges of the teeth at an angle to the parallel lines dependent on the angle of the said plane surfaces to the said lines.

5. A surface broach comprising a plurality of separable oblong broach-cutting teeth and a plurality of separable teeth spacers located intermediate the broach-cutting teeth, certain of the spacers having relatively sloping surfaces, to incline the cutting edges of the teeth relative to a longitudinal central line of the assembled teeth and spacers extending transverse to the teeth and means for clamping the spacers and the teeth together.

6. In a surface broach, a supporting member, a plate located on the member and having relatively inclined opposite side surfaces, a plurality of individually separable cutting teeth having approximately the same dimensions and located on the member to dispose the edges of the cutting teeth in a plane inclined to the surface of the member, and means for securing the teeth and the plate to the member.

7. A surface broach comprising a supporting member, a plurality of separable oblong teeth, the ends of the teeth having recesses, the recesses concavedly curved in planes perpendicular to the supporting surface of the member and convexedly curved in planes parallel to the supporting surface, and means including elements engaging the teeth in the recesses for clamping the said teeth endwise and against the supporting member.

8. A surface broach comprising a base member, a plurality of separable oblong teeth and a plurality of separable oblong spacers located intermediate the teeth supported on the member, the ends of the spacers and the ends of the teeth having curvedly convex surface portions, elements for engaging the said surface portions, and means for clamping the said elements against the said surface portions for clamping the teeth endwise against the said supporting member.

9. A surface broach comprising a supporting member, a plurality of separable teeth and a plurality of separable spacers located intermediate the teeth and supported on the supporting member, the ends of the teeth and the spacers having recesses, the spacers having a greater thickness than the teeth and surfaces sloping from the edges of the recess to the lateral surfaces of the spacers, and means including elements engaging in the recesses for clamping the teeth and the spacers between the elements in a direction endwise of the teeth and spacers.

10. A surface broach comprising a supporting member having a longitudinally extending recess, a plurality of separable broach-cutting teeth located in the recess, means for disposing the teeth at a predetermined angle with respect to a longitudinally extending line of the recess of the supporting member, the ends of the teeth having convexedly curved surfaces in planes parallel to the bottom of the recess, cylindrical elements, clamping members located in the recess, and each of the clamping members and one of the inside lateral surfaces of the recess having an outwardly and downwardly inclined surface with respect to the bottom of the recess for engaging the cylindrical elements to clamp the teeth endwise and to the supporting member at substantially single points on the said curved surfaces.

11. A surface broach comprising a supporting member, a plate located on the member and having parallel opposite side surfaces and a surface relatively inclined to one of the said parallel surfaces and located contiguous to the other of the parallel surfaces, a plurality of separable broach-cutting teeth located on the contiguous of the said parallel and inclined surfaces to locate the cutting edges of certain of the teeth in a plane inclined to the longitudinal axis of the member, and the cutting edges of other of the teeth in planes located parallel to the longitudinal axis of the member.

12. A surface broach comprising a plurality of separable teeth and a plurality of separable spacers located intermediate the teeth having sides that contact with the lateral surfaces of the teeth, certain of the spacers having parallel sides, other of the spacers having side surfaces that are inclined to each other, the ends of the teeth and the spacers substantially located in parallel lines, and means for clamping the teeth and the spacers to dispose the teeth at angles to the parallel lines according to the inclination of the surfaces of the said other of the spacers.

13. A surface broach comprising a supporting member, a wedge-bar having a surface inclined to a longitudinal axis of the supporting member and engaged by the supporting member and a surface at right angles to the longitudinal axis of the supporting member, an adjustable block having a plane surface and a curved surface, the curved surface located in contact with the said right-angularly extending plane surface of the wedge-bar, a plurality of separable teeth, an element having a surface inclined to the longitudinal axis of the supporting member, and means for clamping the teeth between the inclined surface of the element and the plane surface of the block for disposing the teeth in inclined relation to the said axis of the supporting member.

14. A surface broach comprising a base member, a plurality of separable oblong teeth located on the base member, the ends of the teeth substantially located in parallel lines and having registering recesses, means for locating the cutting edges of the teeth in lines inclined to the said parallel lines, elements located in the recesses, and means including the said elements for clamping the teeth endwise and against the base member.

15. A surface broach comprising a base member, a plurality of separable oblong teeth located on the base member, the ends of the teeth located substantially in parallel lines and having registering recesses, the surfaces of the recesses having convexedly curved surfaces, means for locating the cutting edges of the teeth in lines inclined to the said parallel lines, elements located in the recesses, and means including the said elements for clamping the teeth endwise and against the base member.

16. A surface broach comprising a supporting member, a plurality of separable oblong teeth, means for locating the teeth in inclined relation to the longitudinal axis of the supporting member, a clamping member having a plane surface on one side and a curved surface on an opposite side and adapted to engage a part of the supporting member at a point on the curved surface, and means for clamping the teeth in a direction towards the plane surface of the clamping member to cause the clamping member to roll on the curved surface to automatically adjust itself to the inclination of proximate teeth and sustain the pressure that is transmitted through the inclined teeth by the clamping means.

FRANCIS J. LAPOINTE.
ELMER J. LAPOINTE.